3,281,474
ODORIFEROUS COMPOUNDS
Theo Leidig, Holzminden, Germany, assignor to Haarmann & Reimer G.m.b.H., Holzminden, Germany, a corporation of Germany
No Drawing. Filed Sept. 28, 1964, Ser. No. 399,885
Claims priority, application Germany, Oct. 8, 1963,
H 50,477
5 Claims. (Cl. 260—611)

This invention relates to new odoriferous compounds and their preparation.

It has now been found that aliphatic cyclododecanol ethers which contain up to 4 carbon atoms in the ether radical are suitable as odoriferous compounds.

The aliphatic ether radical may be either saturated or unsaturated. The following are examples of ether radicals: methyl, ethyl, n-propyl, n-butyl, allyl, methylallyl and crotyl radicals. Examples of suitable compounds according to the invention and their properties are as follows:

| Ether group | B.P. | $D_4^{20}$ | $n_D^{20}$ | Odour |
|---|---|---|---|---|
| Methyl ether | 95–98° C./2 mm | 0.911 | 1.4742 | Cedar and ambret. |
| Ethyl ether | 117–119° C./3 mm | 0.905 | 1.4740 | Cedarwood. |
| n-Propyl ether | 124–127° C./3 mm | 0.896 | 1.4694 | Cedarwood, tobacco. |
| Isopropyl ether | 114–118° C./3 mm | 0.907 | 1.4759 | Cedar with musk. |
| n-Butyl ether | 127–129° C./3 mm | 0.892 | 1.4696 | Cedarwood. |
| Isobutyl ether | 133–138° C./4 mm | 0.903 | 1.4728 | Cedar-like, precious wood with note of ambret. |
| Allyl ether | 129–131° C./3 mm | 0.912 | 1.4839 | Tobacco, cigar chest. |
| Crotyl ether | 134–140° C./3 mm | 0.910 | 1.4838 | Cedar with musk note. |
| Methallyl ether | 130–135° C./3 mm | 0.912 | 1.4814 | Vetiver, cellar odour. |

The odoriferous compounds used according to the invention have a typical smell of cedar with a characteristic note of musk. They serve e.g. for the preparation of precious wood compositions with a new and original perfume nuance and an enhancing and fixing effect.

The compounds used according to the invention may be obtained, for example, by reacting the alkali compounds of cyclododecanol with alkyl- or alkenyl halides or neutral sulfuric acid esters.

EXAMPLE 1

Precious wood complex:
  250 parts by weight of cyclododecanol methyl ether
  200 parts by weight of cyclododecanol ethyl ether
   50 parts by weight of cyclododecanol methallyl ether
   20 parts by weight of γ-iraldein
   80 parts by weight of delta iraldein
   50 parts by weight of oryclone
   50 parts by weight of vetiveryl acetate
  170 parts by weight of liquid cedryl acetate
   30 parts by weight of guaiyl acetate
  100 parts by weight of cedar ketone
  -----
  1000 parts by weight

EXAMPLE 2

The preparation of the compounds used in accordance with the invention may be carried out as follows:

(a) *Cyclododecanol methyl ether*

1.3 mol=50 g. of sodamide
1.0 mol=184 g. of cyclododecanol
0.7 mol=88 g. of dimethylsulfate
1500 g. of xylene
70 g. of NaOH conc.

The sodamide was separated by suction filtration from a benzene suspension and heated in 200 g. of xylene to boiling point while stirring. During the course of one hour, the cyclododecanol, dissolved in the remaining xylene (1300 g.), is added to the boiling suspension. After boiling for another 2 hours, the evolution of $NH_3$ ceases and dimethylsulfate is carefully added dropwise. A vigorous reaction sets in. The mixture is thereafter stirred for another 4 hours and boiled, poured onto ample ice and 70 g. of concentrated sodium hydroxide, washed once with $H_2O$ and distilled.

Crude cyclododecanol methyl ether: 180 g. (containing cyclododecanol) B.P. 99–106° C.

The crude ether is freed from unreacted cyclododecanol in a 40-layered disc column by distribution between methanol (90%) and gasoline (30–40° C.) in the ratio of 1:10:10. From the gasoline phase there are obtained (all according to the $OCH_3$ content of the crude ether) 150 to 160 g. of cyclododecanol methyl ether of B.P. 86 to 92° C., $D_4^{20}$ 0.9082, $n_D^{20}$ 1.4746 (percent $OCH_3$ 13.1 (theory 15.7)). The cyclododecanol (20 g.) isolated from the methanol phase can be used again.

(b) *Cyclododecanol allyl ether*

After the above-described preparation of the sodium compound of cyclododecanol, 1.2 mol=145 g. of allylbromide are added, boiled for 24 hours, poured onto water, and the crude ether is distilled after washing. The ether is immediately extracted as above. From the gasoline phase there are obtained 130 g. of cyclododecanol allyl ether of B.P. 129–131° C. at 3 mm. Hg and the constants $D_4^{20}$ 0.912, $n_D^{20}$ 1.4839.

The methanol phase still yields about 50 g. of unchanged cyclododecanol.

In a corresponding manner there can be prepared the other ethers.

I claim:
1. Aliphatic cyclo-dodecanol ethers, wherein said aliphatic radical is a member selected from the group consisting of saturated alkyl containing up to 4 carbon atoms, allyl, crotyl, and methallyl radicals.
2. Cyclododecanol methyl ether.
3. Cyclododecanol ethyl ether.
4. Cyclododecanol isopropyl ether.
5. Cyclododecanol allyl ether.

No references cited.

LEON ZITVER, *Primary Examiner.*
B. HELFIN, *Assistant Examiner.*